June 1, 1943.          I. COWLES          2,320,813
COUPLING FOR FLANGED METAL TUBING
Filed Nov. 17, 1941          3 Sheets-Sheet 2

Inventor:
Irving Cowles
By: [signature]
Att'y.

Inventor:
Irving Cowles

Patented June 1, 1943

2,320,813

UNITED STATES PATENT OFFICE 2,320,813

COUPLING FOR FLANGED METAL TUBING

Irving Cowles, Detroit, Mich., assignor to Irving Cowles and Rudolph W. Lotz, Chicago, Ill., successor cotrustees to Union Bank of Chicago, Illinois, a corporation of Illinois Application November 17, 1941, Serial No. 419,423

28 Claims. (Cl. 285—86)

This invention has for its main object to provide a coupling for connecting a flanged metal tube with a seat member in such manner as to relieve the flange of the tube of all tensile, torsional and vibration stresses, and to so diffuse vibration stresses on the tube as to vastly increase its normal life against fractures due to said vibration and to tortional stresses.

Another object of the invention is to provide a coupling of the type specified which will not loosen responsively to vibration and temperature changes.

A further object of the invention is to provide a coupling of the type specified which includes internal tube engaging parts which are connected with each other and can be removed and replaced, but are so associated that the user cannot replace them in wrong relation to each other.

A further object of the invention is to provide a coupling of the type aforesaid which can be made to fit tubing of very small diameters as well as large diameters and the several component parts of which can be made of a variety of types of metals suited to the purpose.

Additional objects of the invention are pointed out in or will be readily understood from the following specification.

Suitable embodiments of the invention are illustrated in the accompanying drawings wherein, Fig. 1 is a fragmentary detail central vertical sectional view of a coupling constructed in accordance with the invention with one part shown in elevation and another part also shown in both section and elevation and partly broken away.

Fig. 2 is also a fragmentary central longitudinal sectional view on a larger scale than Fig. 1 with parts broken away and the male member omitted.

Fig. 3 is a view similar to Fig. 1 showing a modified form of construction.

Figure 4:
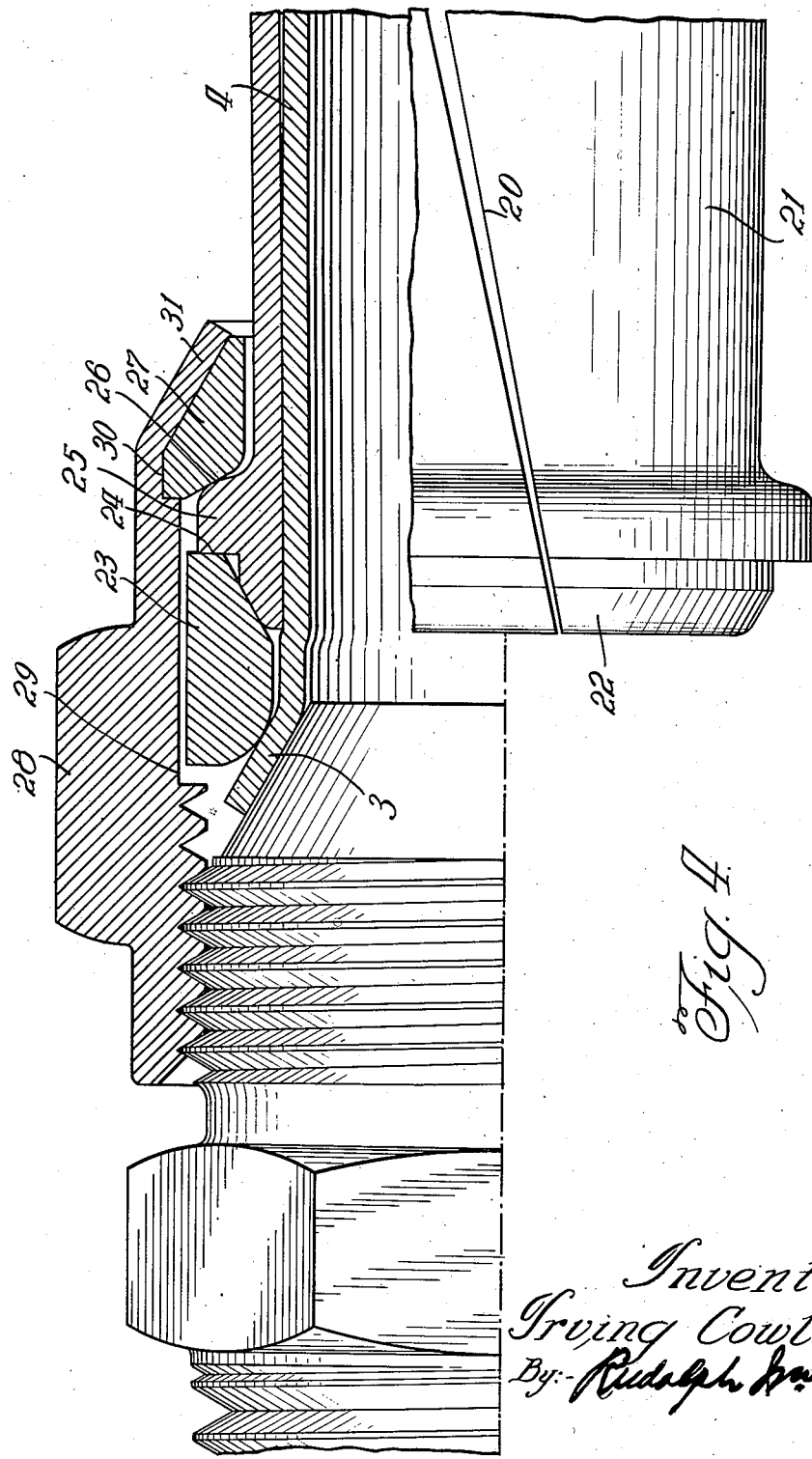
Fig. 4 is a view similar to Fig. 3 on a larger scale showing another structural modification.

Couplings for metal tubing of the soft, ductile type composed of aluminum, copper, brass and steel, respectively, are used in tremendous quantities in aeronautic, marine and vehicle arts, including all types of such equipment used for defense and war purposes.

In all such uses of said type of tubing and couplings, the factors of vibration and temperature changes constitute grave dangers, in that they act to loosen couplings and cause crystallizations and fractures of the tubing and consequent leaks in conduits which are used in hydraulic controls and otherwise. A small leak in such a conduit is extremely dangerous and has caused crashes of air-craft of all types, and where such leaks occur in fuel supply lines, have caused air-craft to burst into flames while in flight.

The importance of couplings that are safe against loosening, as aforesaid, is easily apparent, but that feature of safety is not by any means the only one of extreme importance, as there are several other safety features required that are of equal importance. One of the latter resides in the necessity of relieving the tube flanges of tensile, torsional and vibrational stresses which, in all couplings for the aforesaid flanged tubing now in use, are completely ignored.

Another factor of danger lies in fractures of the tube along the outer end of the sleeve-nut of the coupling due to contacts therewith by vibration of the tube. That vibration contact causes crystallization of the metal of the tube at this point and consequent fractures, and only one of the couplings on the market today provides means for diffusing that vibration over a short length of the tube.

The coupling of the present invention comprehensively guards against all of the causes of leakages and fractures in a very simple, cheap and efficient manner, and, additionally, may be used as one part of a very simple and efficient tube flanging means.

The coupling of this invention includes a conventional male member 1, equipped with a seat 2 for the flange 3 of the tube 4.

The seat 2 varies in couplings made by different manufacturers from a taper of 45° to a taper of 35° to the axis of the male member and it is extremely desirable that the companion part of the coupling, comprising the sleeve nut 5 and parts contained therein (described hereinafter) shall be so designed that they may be interchanged with any sleeve nut of another type of coupling regardless of the taper of the seat 2 of member 1 of such other coupling so long as the threads of the latter match those of the sleeve nut 5, member, said shoulder being present as soon as the said nose is contracted. Thereafter, said nose continues movement toward the seat member, a negligible distance, possibly one to three thousandths of an inch.

Due to the cooperation of the frictional contacts aforesaid, and possibly also to some yielding of the metal to the wedging pressures involved, the nut is turned from fifteen to thirty degrees beyond the point at which an absolutely fluid-tight joint is assured between the male member and the tube, to withstand the maximum pressure of fluid capable of being borne by the tube. This further rotation of the nut produces what is termed "drag" in the interengaged threads and which serves to prevent, absolutely, any loosening of the nut in response to vibrations and temperature changes.

While it is preferable to make the split sleeve of a more or less highly resilient metal, that is not necessary. The metal used must, however, be sufficiently hard to prevent its permanent distortion by the forces to which it is subjected, the latter being also true of the ring member.

In instances in which the split sleeve is made of aluminum or an aluminum alloy, the inner tapered face of the flange of the nut is covered by a washer 16 of bronze or hard brass to reduce friction, such a washer being particularly necessary if the nut is also made of the same metal as the split sleeve.

While the ring member 6, shown in Fig. 3, is separable from the portion 12 of the split sleeve, it is preferable to connect rotatably, and for limited relative longitudinal movement, the ring member 6 and the split sleeve as shown in Fig. 1 so that mechanics not familiar with the coupling, but who are called upon to remove the same from one tube 4 and mount it upon another tube, may not reverse the ring member and thus fail to secure the desired result.

Thus, in the instance of Figs. 1 and 2, the ring member 6 is equipped with an unsplit annular flange 17 bordering the tapered bore portion 8 thereof and terminating in an inwardly projecting annular lip 18. Said flange 17 is flared initially to an extent sufficiently to render the inner diameter of the lip 18 sufficient to permit passage therethrough of the cylindrical end portion of the portion 13 of the split sleeve. The said portion 13 is provided between its ends with the annular recess 19 of appreciably greater length than the lip 18 which is caused to project into said recess 19 by effecting contraction of the flange 17 and the lip 18 by means of a suitable die in a well known manner.

After such contraction, the inner diameter of the lip 18 is such that the portion 12 of the split sleeve can expand sufficiently to receive what is known as "over-sized" tubing, while the depth of projection of said lip 18 into the recess 19 is such that when said portion 12 of the split sleeve is fully contracted to the limit fixed by the slot 11, the lip 18 will still lie in the path of the end walls of said recess 19.

In the structure of Fig. 3, the split sleeve 10a is provided with a longitudinal slot 11a and terminates at a point spaced from the extremity of the tail portion 13a, the bore of said sleeve 10a being of sufficiently larger diameter than the tube 4 to leave a very small progressively decreasing annular space around the tube 4 from the extremity of said tail portion to the point where said bore meets the tube after contraction of the nose portion of said split sleeve.

In the structure of Fig. 4, the slot 20 of the split sleeve 21, made of lightly resilient metal, is of such width that it will not be closed at the nose of the head portion 22 thereof when the ring member 23 is firmly seated upon the flange 3 of the tube 4.

In this structure the extent of projection of the nose portion of said part 22 of the split sleeve is limited by contact of the annular shoulder 24 of the part 22 with the upper edge of the ring member 23. Said shoulder is at one end of an annular flange 25 of said part 22 which presents an annular shoulder 26 of arcuate form in cross section for engagement with a ring member 27 disposed in the outer end of the sleeve nut 28 and may be rigid therewith.

It will be noted that in the structure of Fig. 4 the crowns of the threads of the sleeve-nut project inwardly of the bore portion 29 of said nut containing the ring member 23 and flange 25, so that said ring member 23 cannot be withdrawn from said nut.

The outer end portion of the sleeve nut is suitably provided with a cylindrical bore 30 of larger diameter than the bore 29, so that the ring member 23 and flange 25 may pass into the bore 29. The ring member 27 being then inserted into the bore 30 and the annular flange 31 resulting from the bore 30 then contracted as shown to engage the tapered upper end outer surface of the ring member 27.

The several sleeve nuts and contained parts described hereinabove are also very advantageous in that they may be used as vise elements in association with a tube-flanging tool illustrated in Fig. 5.

It may happen that a tube is required to be replaced in the field where no vise in available, or if the vise is available, the necessary means for attaining a substantially annular hold on the tube are not present, and in such event, the vise could not be used because the flat jaws thereof would flatten the soft metal tube.

Figure 5:
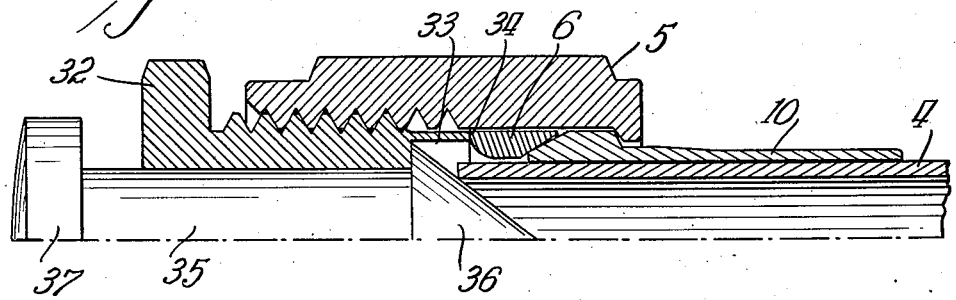
Fig. 5 is a central longitudinal sectional view showing the sleeve nut and parts associated therewith mounted upon a tube flanging tool preparatory to flanging the same.

The tools of the type shown in Fig. 5 of size or sizes for use in flanging tubes of the size or sizes used in such field, can easily be carried in the workmen's pockets. Extra tubing is usually provided for field replacements.

The tool comprises an externally threaded body member 32 equipped in its upper end with a cylindrical flat bottomed cavity 33 and an annular flat top surface 34 upon which the ring members 6 of Figs. 1, 2 and 3, and the ring member of Fig. 4, is adapted to rest when the sleeve nut is mounted upon the member 32 as shown.

The member 32 is equipped with an axial bore through which the shank 35 of a conical head 36 passes losely, the base of said head 36 being normally resting upon the flat bottom of the cavity 33. A suitable head 37 is mounted upon the other end of the shank 35 and is spaced a predetermined distance from the lower end of the member 32 to limit the upward movement of the conical head 36.

In operation, the sleeve nut is first threaded upon the body member 32 to a point spaced from the lower limit of its movement. A tube is then inserted through the split sleeve and is made to rest upon the conical head 36 and the sleeve nut is then rotated until it attains the limit of its movement with respect to the member 32.

When that limit is attained, the tube 4 will be more firmly engaged by the split sleeve against longitudinal movement with respect to the sleeve nut and member 32 than in a vise.

Hammer blows are then applied to the head 37 to force the conical head into the tube to flare the latter and produce the flange 3.

The conical head thus acts as a stop for the end of the tube which then projects sufficiently below the lower end of the ring member of the sleeve nut to cause the flange of the tube formed by the flaring tool to be of the required width.

The shank 35 is so loosely mounted in the member 1 as to permit the conical head to move laterally sufficiently to become disposed axially of the duct of the tube. This is necessary because in some instances the said duct is slightly eccentric of the outer surface of the tube.

In every one of structures of Figs. 1 to 4 inclusive, the tube engaging elements are automatically centered and self-aligned with respect to each other and the axis of the outer surface of the tube, so that the outer extremity of the tail portion of the split sleeve is spaced from the tube unless the latter is not absolutely straight from the flange 3 to a point slightly beyond said extremity.

In the event that the tube is not straight, a point in its surface may lie in contact with said extremity, but since the tail portion 13 is very thin, it will not bear against the tube with any appreciable degree of pressure and will not interfere appreciably with the diffusion and absorption of the vibratory stresses on the tube.

In the structure of Fig. 3 the split sleeve may be equipped with several longitudinal slots 40 provided that they be made so narrow that the total of the several widths does not exceed the width of the slot shown. This modified form of split sleeve is illustrated in Fig. 6.

In the instance of Figs. 1, 2 and 4, the split sleeve may be equipped with the end-to-end slot shown, but narrower than the latter and with one or more additional slots 41 like that of Fig. 3, so long as the total aggregate widths of all of the said slots shall not exceed the width of the single slot shown.

Figure 6:
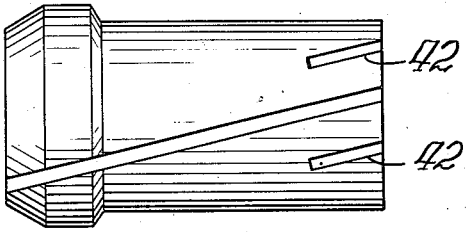
Figs. 6, 7 and 8 are side elevations illustrating modified forms of construction of split sleeves of the coupling.
Figure 7:
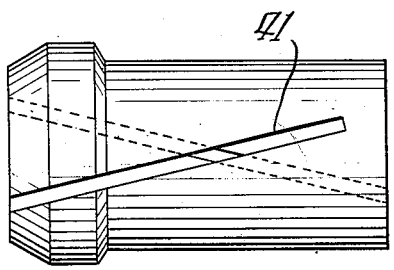
Figure 8:
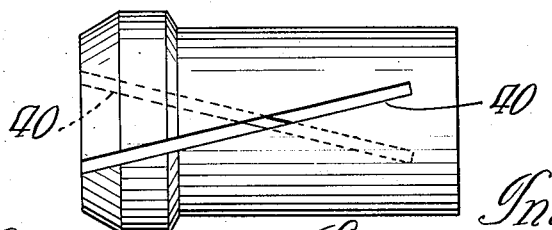

In all instances the outer ends or tail portions of the split sleeves may be provided with a number of slots 42 extending from their outer extremities toward their inner ends, as shown in Fig. 6.

It will be noted that in the completed conduit the bore of the slotted sleeve is very slightly tapered and that the tube embraced thereby is contracted to the greatest degree at the nose of the head and from that point to a progressively lesser degree to a vanishing point between the ends of said slotted sleeve. The position of said vanishing point will vary with the so-called "tolerance" diameter of the tubes and will be nearer the outer extremity of the slotted sleeve where the tube is of greatest tolerance diameter and farthest removed from said last named extremity where the tube is of smaller tolerance diameter. The maximum tolerance generally allowed is five thousandths of an inch plus or minus the specified outer diameter of the tube.

In the instances illustrated the bores of the slotted sleeves are cylindrical and become tapered by the difference in taper of the head portion of the slotted sleeve and the bore portion of the ring member which receives the same. But in place of relying upon this difference in tapers last mentioned, the slotted sleeves may be equipped with tapered instead of cylindrical bores and the tapers of the bore portion of the ring member and the head portion of the slotted sleeve made coincident to produce the same result as is produced by the structural details shown and described, the latter constituting the cheaper expedient.

If, however, the slotted sleeve is made with the tapered bore and the tapers of the ring-member bore portion and head portion are made coincident, then the slot of the sleeve should extend preferably from end to end of the latter in order that the portion of the slot extending through the head portion may close throughout its entire length.

Having the bore of the slotted sleeve slightly tapered in the completed conduit as shown and described, is of the essence of the invention.

When the conduit is competed, the sleeve nut has a long drag engagement with the male member and cannot be loosened except by force equal or substantially equal to that applied to the nut in completing the conduit, and continuing through an arc of 15 to 20 degrees to progressivly less resistance before the nut can be turned by hand. This drag is so pronounced that it renders impossible the loosening of the nut by vibration and temperature changes and constitutes one of the advantageous and important safety features of the structure, since the other features of safety and efficiency are dependent upon this drag of the nut to retain them in their position in the conduit.

This drag of the nut results from the wedging together of the opposed tapered surfaces, in all probability, and is incident to the structural characteristics and cooperative relation of the parts within the sleeve-nut and possibly some yield of the metal with spring like action aside from surface resistances.

In the completed conduit, the slotted sleeve bore is tapered throughout its length on the angle of difference in taper between the tapered bore of the ring member and the taper of the sleeve-head. If that difference is one degree then the inner surface of the contracted sleeve will extend at an angle of one-half degree to its axis. If the said difference in tapers is two degrees then the bore of the contracted sleeve will, radially, extend at an angle of one degree to said axis.

Substantially the same result is obtainable by initially making the bore of the slotted sleeve tapered to the extent desired, as above indicated and, in that event, the tapers of the bore of the ring member and the outer surface of the sleeve head will be identical and cause the head to contract throughout its entire length as it is forced into the tapered bore of the ring member, it being obvious that the tail portion of the slotted sleeve will contract also to substantially the same extent as the head portion thereof.

The construction shown and described is preferable because of lower cost of manufacture than an internally tapered bore sleeve, but the result in the completed conduit will be the same or substantially so.

I claim as my invention:

1. A coupling of the type specified comprising a threaded male member equipped with a seat for the flange of a tube, a sleeve nut engaged at one end with said male member and equipped at its other end with an inwardly extending annular flange, a ring member within the nut engaged with the tube flange at one end and equipped at its other end with a tapered bore portion, a split sleeve having a tapered nose portion engaged in the tapered bore of the ring member and equipped with an annular shoulder engaged with said flange and contractible to engage said tube responsively to pressure exerted thereon by said flange the nose portion of said split sleeve and the taper of the bore portion of said ring member differing to cause the inner extremity of said sleeve to be contracted first and the remainder of said sleeve to be contracted to a progressively less degree than said extremity, said respective tapers being such that their opposed surfaces meet when the said sleeve attains the inner limit of its movement.

2. A coupling of the type specified comprising a threaded male member equipped with a seat for the flange of a tube, a sleeve nut engaged at one end with said male member and equipped at its other end with an inwardly extending annular flange, a ring member within the nut engaged with the tube flange at one end and equipped at its other end with a tapered bore portion, a contractible sleeve equipped with means for limiting its contraction to a predetermined smaller diameter and having a tapered nose portion engaged in the tapered bore of the ring member and equipped with an annular shoulder engaged with said flange and contractible to engage said tube responsively to pressure exerted thereon by said flange.

3. A coupling of the type specified comprising a threaded male member equipped with a seat for the flange of a tube, a sleeve nut engaged at one end portion with said male member and equipped at its other end with an inturned annular flange, a ring member and a longitudinally slotted sleeve disposed within said nut with said ring member disposed in engagement with the tube flange and said sleeve engaged with the flange of said nut, the latter and said sleeve equipped with interengaged formations whereby said sleeve will be contracted to engage the tube and at the same time force said ring member upon said tube flange responsively to rotation of said nut in one direction.

4. A coupling of the type specified comprising a threaded male member equipped with a seat for the flange of a tube, a sleeve nut engaged at one end portion with said male member and equipped at its other end with an inturned annular flange, a ring member and a longitudinally slotted sleeve disposed within said nut with said ring member disposed in engagement with the tube flange and said sleeve engaged with the flange of said nut, the latter and said sleeve equipped with interengaged formations whereby said sleeve will be contracted to engage the tube and at the same time force said ring member upon said tube flange responsively to rotation of said nut in one direction, the slotting of said tube being such as to limit its contraction to a predetermined smaller diameter.

5. A coupling of the type specified comprising a threaded male member equipped with a seat for the flange of a tube, a sleeve nut engaged at one end portion wtih said male member and equipped at its other end with an inturned annular flange, a ring member and a longitudinally slotted sleeve disposed within said nut with said ring member disposed in engagement with the tube flange and said sleeve engaged with the flange of said nut, the latter and said sleeve equipped with interengaged formations whereby said sleeve will be contracted only along a portion interengaged with said ring member to engage the tube and at the same time force said ring member upon the tube flange responsively to rotation of said nut in one direction, the portion of said sleeve extending from said contracted portion to its outer end being contracted to an extent progressively less than the degree of contraction thereof along said first-named contracted portion.

6. A coupling of the type specified comprising a threaded male member equipped with a seat for the flange of a tube, a sleeve nut engaged at one end portion with said male member and equipped at its other end with an inturned annular flange, a ring member and a longitudinally slotted sleeve disposed within said nut with said ring member disposed in engagement with the tube flange and said sleeve engaged with the flange of said nut, the latter and said sleeve equipped with interengaged formations whereby said sleeve will be contracted only along a portion interengaged with said ring member to engage the tube and at the same time force said ring member upon the tube flange responsively to rotation of said nut in one direction, the portion of said sleeve extending from said contracted portion to its outer end being contracted to an extent progressively less than the degree of contraction thereof along said first-named contracted portion, the slotting of said tube being such as to limit its contraction at all points in its length to a predetermined smaller diameter.

7. A coupling of the type specified comprising a threaded male member equipped with a seat for the flange of a tube, a sleeve nut engaged at one end with said male member and equipped with an inwardly projecting annular part spaced from said end portion, a ring member loosely mounted within said nut and engaged with the tube flange, a longitudinally slotted sleeve engaged with the last-named part of said nut and disposed loosely within said nut and embracing the tube, the slotting of said sleeve being such as to limit its contraction at any selected point to a predetermined smaller diameter, said ring member and said sleeve being equipped with interengaged means whereby a portion of said sleeve engaged with said ring member will be contracted to the fullest extent determined by said slotting to engage said tube and simultaneously therewith force said ring member into firm engagement with the tube flange responsively to rotation of said nut in one direction, the diametric dimensions of said sleeve being decreased progressively from the portion of complete contraction of same.

8. A coupling of the type specified, comprising a threaded male member equipped with a seat for the flange of a tube, a sleeve nut engaged at one end with said male member and equipped with an inwardly projecting annular part spaced from said end portion, a ring member, an internally substantially cylindrical longitudinally slotted sleeve disposed about the tube and having at least a portion thereof loosely disposed within the nut for engagement with said annular part thereof and with said ring member, the latter and said sleeve equipped with interengageable formations whereby the slotting of said sleeve will be contracted responsively to rotation of the nut in one direction to grasp the tube, said inwardly projecting part of said nut cooperating with the slotting of said tube and said ring member to limit contraction of said sleeve to a predetermined smaller diameter and effect the clamping of the tube flange between the ring member and said seat.

9. A coupling of the type specified, comprising a threaded male member equipped with a seat for the flange of a tube, a sleeve nut engaged at one end portion with said male member and equipped with an inwardly projecting part spaced from said end portion, an unsplit ring member loosely disposed within said nut for engagement with the tube flange, a longitudinally slotted contractible and internally cylindrical sleeve having a head portion disposed within said nut for engagement with said ring member and said inwardly projecting part of said nut, the said sleeve portion and said ring member equipped with interengageable formations operating to effect contraction of a predetermined portion of said sleeve for grasping the tube responsively to rotation of said nut in one direction, and means whereby the ring member is forced into compressing relation to the tube flange responsively to further rotation of said nut in said direction after partial contraction of said sleeve has been effected, the contraction of the said predetermined portion of said sleeve effecting progressively decreasing contraction thereof throughout a major portion of its length.

10. A coupling of the type specified, comprising a threaded male member equipped with a seat for the flange of a tube, a sleeve nut engaged at one end portion with said male member and equipped with an inwardly projecting part spaced from said end portion, an unsplit ring member loosely disposed within said nut for engagement with the tube flange, a longitudinally slotted, contractible and internally substantially cylindrical sleeve having a head portion disposed within said nut for engagement with said ring member and said inwardly projecting part of said nut and having a relatively thin walled tail portion projecting through said inwardly projecting part of said nut, the slotting of said sleeve extending into said tail portion, said ring member and said head portion of said sleeve equipped with cooperating formations for effecting contraction of said sleeve to a smaller diameter in decreasing degree from the inner extremity thereof through the length of the slotting of said sleeve responsively to rotation of said nut in one direction, and means cooperating with said head portion of said sleeve and the ring member following partial contraction of said sleeve extremity for compressing said ring member against said tube flange responsively to further rotation of said nut in said direction while also limiting the extent of contraction of said sleeve.

11. A coupling of the type specified, comprising a threaded male member equipped with a seat for the flange of a tube, an unsplit ring member seated at one end upon the outer face of said flange and provided in its other end portion with a tapered bore, a split sleeve disposed about the tube and equipped with a tapered nose portion projecting into said tapered bore portion of said ring member and also equipped with an annular shoulder, and a sleeve nut engaged with said male member at one end portion and equipped internally with means engageable with said shoulder and cooperating with said ring member to force said tapered end portion for effecting a predetermined degree of contraction of said tapered end portion and compression of said ring member upon said flange responsively to rotation of said nut in one direction.

12. In a structure of the type specified, including a conventional male member and a sleeve nut engaged therewith and equipped with an inturned annular formation, an unsplit ring member disposed at one end upon the tube flange and equipped in its other end with a tapered bore portion, an internally cylindrical split sleeve of normally larger diameter than the tube disposed upon the latter and terminating at one end in an externally tapered head of sharper taper than and adapted to be received in said tapered bore portion for contraction by the latter, there being an annular space between said bore portion about said tapered head of greatest width at the mouth of said bore portion, said head equipped with a tapered annular shoulder and said annular portion of said nut opposed to said shoulder being of sharper taper than said shoulder for primarily engaging the rim of the latter for forcing said head into said tapered bore for contraction thereof to a predetermined smaller than normal diametric dimensions of said head and smaller inner diametric dimensions than the outer diameter of the tube.

13. In a structure of the type specified, including a conventional male member and a sleeve nut engaged therewith and equipped with an inturned annular formation, an unsplit ring member disposed at one end upon the tube flange and equipped in its other end with a tapered bore portion, an internally cylindrical split sleeve of normally larger diameter than the tube disposed upon the latter and terminating at one end in an externally tapered head of sharper taper than and adapted to be received in said tapered bore portion for contraction by the latter, there being an annular space between said bore portion about said tapered head of greatest width at the mouth of said bore portion, said head equipped with a tapered annular shoulder and said annular portion of said nut opposed to said shoulder being of sharper taper than said shoulder for primarily engaging the rim of the latter for forcing said head into said tapered bore for contraction thereof to a predetermined smaller than normal diametric dimensions of said head and smaller inner diametric dimensions than the outer diameter of the tube, said shoulder being engaged over substantially its entire width by the opposed surface of said formation when said head has attained the aforesaid position responsively to rotation of said nut in one direction.

14. A means for utilizing the sleeve nut of a coupling as above described in any one of the foregoing claims, as part of a tube flanging tool, including a threaded member to engage the sleeve nut and terminating in an annular flange constituting a seat for the ring member of said sleeve nut and bordering a cavity in said male member, a conical head seated upon the bottom of said cavity with its surface spaced longitudinally from said seat for said ring member and affording a stop for a tube extending through said sleeve member, and a shank on said head extending axially through said sleeve member, said sleeve nut adapted to be rotated in the direction of said threaded member after the tube end rests upon said head to cause the split sleeve to obtain a vise-like hold upon the tube, the said head being adapted to be then forced toward said ring member for cooperation with the latter to flare said tube end portion.

15. A tube flanging means comprising a sleeve nut, a contractible split sleeve element disposed within the same, a ring member disposed to embrace a part of said sleeve adjacent the mouth of said nut, an inturned means at the other end of said nut engageable with said split sleeve to move the same toward the mouth of said nut and into said ring member for effecting contraction of said split sleeve into firm engagement with the tube while said ring member is seated, a threaded member engaged with said nut and equipped with a seat for said ring member and provided with a cylindrical cavity bordered by said nut, a conical head seated upon the bottom of said cavity and equipped with a shank extending axially through said threaded member, the spacing of said head from said ring member when the latter is seated and said split sleeve is contracted being such that a predetermined length of the tube resting upon said head is free to be flanged by forcing said head toward said ring member.

16. A conduit including a metal tube equipped with a terminal flange, a male member equipped with a seat for said flange, a ring member seated on said flange, a longitudinally slotted tapered bore sleeve engaged at its smallest diameter portion within said ring member, and a sleeve nut engaged with said male member and operatively associated with said slotted sleeve to maintain the same engaged with said ring member to maintain the latter compressed upon said flange.

17. A conduit including a metal tube equipped with a terminal flange, a male member equipped with a seat for said flange, a ring member seated on said flange, a longitudinally slotted tapered bore sleeve engaged at its smallest diameter portion within said ring member, and in firm engagement with the said tube along its smallest diameter end portion, and a sleeve nut engaged with said male member and operatively associated with said slotted sleeve to maintain the same engaged with said ring member to maintain the latter compressed upon said flange.

18. A conduit including a metal tube equipped with a terminal flange, a male member equipped with a seat for said flange, a ring member seated on said flange, a longitudinally slotted tapered bore sleeve engaged at its smallest diameter portion within said ring member, the said end portion of said sleeve being engaged in a radially contracted portion of said tube, and a sleeve nut engaged with said male member and operatively associated with said slotted sleeve to maintain the same engaged with said ring member to maintain the latter compressed upon said flange.

19. A conduit comprising a flanged metal tube, a member equipped with a seat for the flange of said tube, a ring member seated upon said flange, a longitudinally slotted radially contracted sleeve disposed about and engaged with said tube and said ring member, a sleeve nut having threaded engagement with said first-named member and said sleeve and maintaining the sleeve contracted and maintaining said ring member compressed upon said flange, said tube equipped with formations extending throughout an applicable length of the same and in which the lower end portion of said sleeve engages the upper end portion of the latter being tapered internally and spaced from tube a progressively increasing distance from the outer end of said formation to the outer end of said sleeve.

20. A structure as defined in claim 1, wherein the split sleeve is equipped with a single slot extending from end to end thereof and the bore of said sleeve is normally cylindrical and is rendered slightly tapered throughout its length by contraction thereof.

21. A structure as defined in claim 1 wherein means are provided for limiting the degree of contraction of the inner extremity of the split sleeve and the contraction of the tube resulting therefrom, and wherein the pressure of the nut is transmitted to the ring member via the split sleeve after the said limit of contraction of the latter has been attained, thereby to force said ring member into sufficient pressure exertion upon the tube flange to produce a fluid-tight joint between the latter and the male member.

22. A structure as defined in claim 1 wherein the sleeve has a normally cylindrical bore and is equipped with a single slot of predetermined width extending from end to end thereof and wherein said bore is caused to become slightly tapered by the contraction of said slot to a progressively decreasing degree from the inner extremity of said nose portion toward the outer end of said sleeve, and wherein means are provided for limiting the extent of contraction of said slot and causing pressure of the nut to be transmitted to the ring member via said sleeve following contraction of said slot to its predetermined limit for forcing said ring member into sufficient pressure-exerting relation to the tube flange to produce a fluid-tight connection between the latter and the male member.

23. A structure as defined in claim 1 wherein the opposed shoulders of the split sleeve and the nut flange are tapered and the respective tapers thereof differ to substantially the same degree as the opposed surfaces of the tapered bore portion of the ring member and the nose portion of the said sleeve to cause the opposed surface portions of the first-named shoulders to meet when the last-mentioned opposed surfaces meet, and wherein said respective positions of said shoulders are retained during further movement of the nut for causing the ring member to exert sufficient pressure upon the tube flange to effect fluid-tight connection of the latter with said male member.

24. A structure as defined in claim 1 wherein the split sleeve and the ring member are confined against escape from the nut and are movable rotatably and longitudinally with respect to each other within the nut.

25. A structure as defined in claim 1 wherein the ring member is equipped with a tube flange engaging surface which is substantially arcuate in diametric section and wherein said ring member and split sleeve are trapped against escape from the nut and are movable with respect to each other rotatably and longitudinally and wherein the split sleeve tends to release itself from engagement with the ring member and is engageable from the exterior of the nut to effect its disengagement from said ring member.

26. A structure as defined in claim 1 wherein the split sleeve is equipped with a shank portion of appreciably smaller diameter than the average diameter of its tapered nose portion and which is equipped with a single longitudinal slot extending entirely through said tapered nose portion and throughout at least the greater part of said shank portion.

27. A structure as defined in claim 1 wherein the split sleeve is equipped with a single longitudinal gap of a predetermined width which is adapted to be contracted completely to limit the degree to which said sleeve contracts the tube responsive to pressure of the sleeve nut and wherein means are provided to limit such complete contraction of said split sleeve to its innermost end thereby to cause the same to act as an unsplit collar for transmission of pressure of the nut to the ring member and thus transmit the said pressure to the tube flange.

28. A coupling comprising a male member equipped with a seat for the seat formation of one end of a tube equipped with an annular outwardly projecting shoulder element, a nut having thread engagement with said male member and equipped with an inwardly projecting flange, an unsplit sleeve within said nut adapted to be disposed over the tube in engaging relation to said shoulder element, a resilient split sleeve within the nut between the unsplit sleeve and said flange, the latter, said unsplit sleeve and said split sleeve equipped with cooperating opposed respectively differently tapered surfaces whereby upon rotating said nut in one direction the split sleeve transmits pressure of the nut flange to the unsplit sleeve to force the latter against said shoulder element while effecting contraction and canting of said split sleeve to cause the innermost end portion of the latter to bear upon and clamp the tube against movement relative to the nut and thereby also causing the aforesaid differently tapered surfaces to meet over their entire areas.

IRVING COWLES.

June 1, 1943.                R. G. CUDINI                2,320,814
                WORK SUPPORTING FIXTURE AND METHOD
            Filed July 19, 1941            2 Sheets-Sheet 1
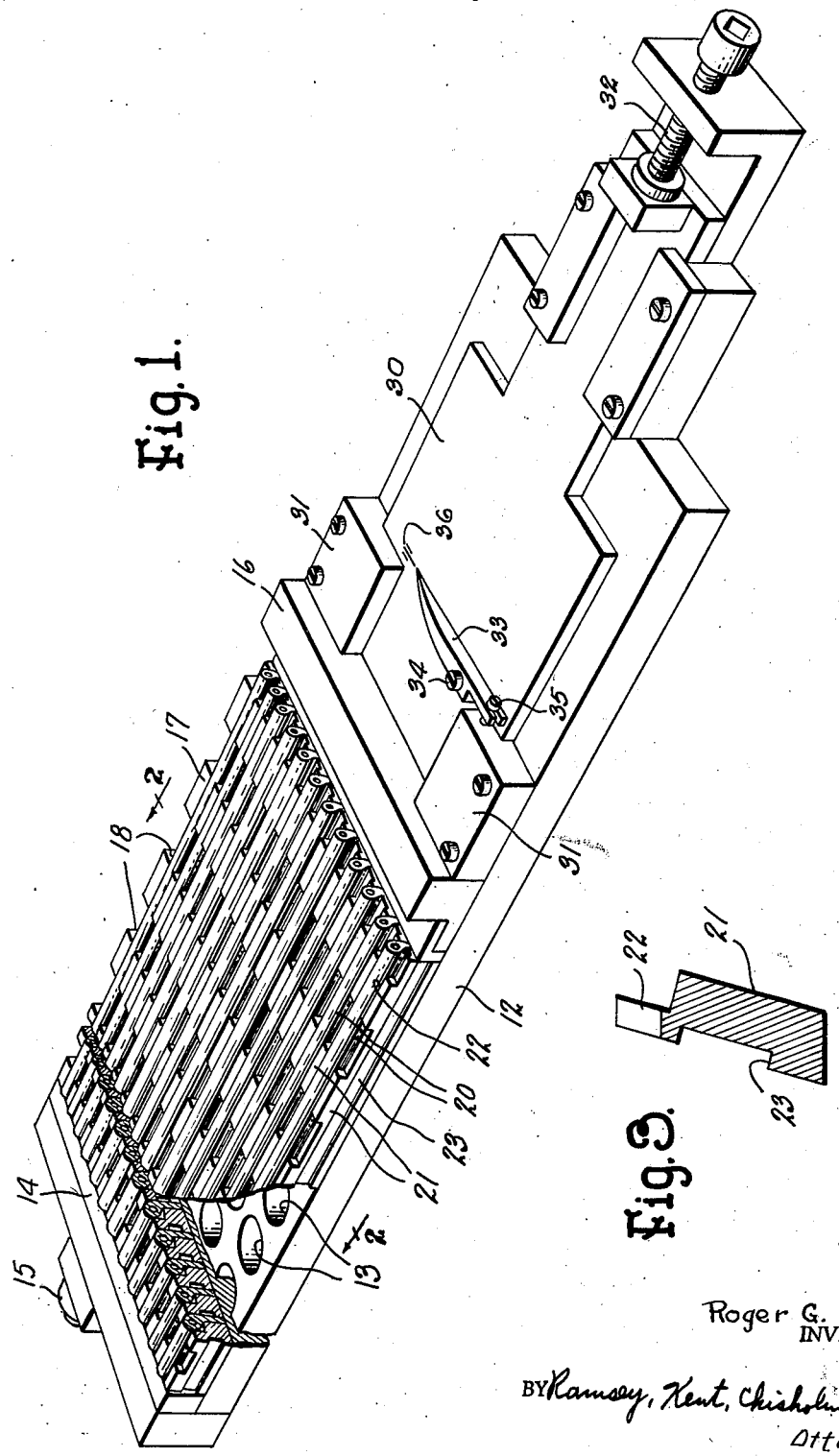
Roger G. Cudin
INVENTOR.
BY Ramsey, Kent, Chisholm + Lutz
Attorneys